United States Patent
Caro

(10) Patent No.: US 9,517,974 B2
(45) Date of Patent: Dec. 13, 2016

(54) METHODS TO CONVERT MEALWORM CASTINGS TO ORGANIC FERTILIZER

(71) Applicant: Joseph J. Caro, Huntington Beach, CA (US)

(72) Inventor: Joseph J. Caro, Huntington Beach, CA (US)

(*) Notice: Subject to any disclaimer, the term of this patent is extended or adjusted under 35 U.S.C. 154(b) by 0 days.

(21) Appl. No.: 15/186,324

(22) Filed: Jun. 17, 2016

(65) Prior Publication Data

US 2016/0297720 A1  Oct. 13, 2016

Related U.S. Application Data

(63) Continuation-in-part of application No. 14/326,826, filed on Jul. 9, 2014, now Pat. No. 9,394,208.

(51) Int. Cl.
| | |
|---|---|
| *C05F 3/00* | (2006.01) |
| *C05B 17/00* | (2006.01) |
| *C05G 3/00* | (2006.01) |
| *C05F 1/00* | (2006.01) |

(52) U.S. Cl.
CPC .............. *C05F 1/005* (2013.01); *C05B 17/00* (2013.01); *C05F 3/00* (2013.01); *C05G 3/0064* (2013.01); *C05G 3/0076* (2013.01)

(58) Field of Classification Search
None
See application file for complete search history.

(56) References Cited

U.S. PATENT DOCUMENTS

| | | | | |
|---|---|---|---|---|
| 9,394,208 | B2 * | 7/2016 | Caro | C05F 3/00 |
| 2011/0160058 | A1 * | 6/2011 | Fedkenheuer | C05C 9/00 |
| | | | | 504/101 |
| 2013/0316903 | A1 * | 11/2013 | Hughes | C05G 3/0094 |
| | | | | 504/102 |

FOREIGN PATENT DOCUMENTS

| | | | |
|---|---|---|---|
| CN | 101817704 | * | 9/2010 |
| CN | 102391039 | * | 3/2012 |
| CN | 103113143 | * | 5/2013 |
| CN | 103539515 | * | 1/2014 |
| CN | 104292027 | * | 1/2015 |
| CN | 104529615 | * | 4/2015 |
| CN | 104609938 | * | 5/2015 |
| CN | 104609940 | * | 5/2015 |
| CN | 104725160 | * | 6/2015 |

* cited by examiner

*Primary Examiner* — Wayne Langel
(74) *Attorney, Agent, or Firm* — Morrison & Foerster LLP

(57) ABSTRACT

Methods to convert the light and powdery mealworm castings into a suitable fertilizer product are disclosed. The methods can include saturating the mealworm castings using an infusion process with a liquid, such as water, until an elevated temperature is reached. The mealworm castings can be replenished and the infusion process can be repeated until the targeted N—P—K rating is achieved. The saturated mealworm castings or mealworm castings can be dried and formed into fertilizer pellets or into a granular soil-like product. In some examples, a binding agent such as dried mashed potato extract can be added to the saturated mealworm castings. In some examples, the fertilizer excludes artificially produced chemicals, hormones, antibiotics, and steroids. In some examples, the fertilizer has an N—P—K rating of 4-3-2. In some examples, the mealworm castings are produced by mealworms fed wheat bran and raw carrots.

20 Claims, 11 Drawing Sheets

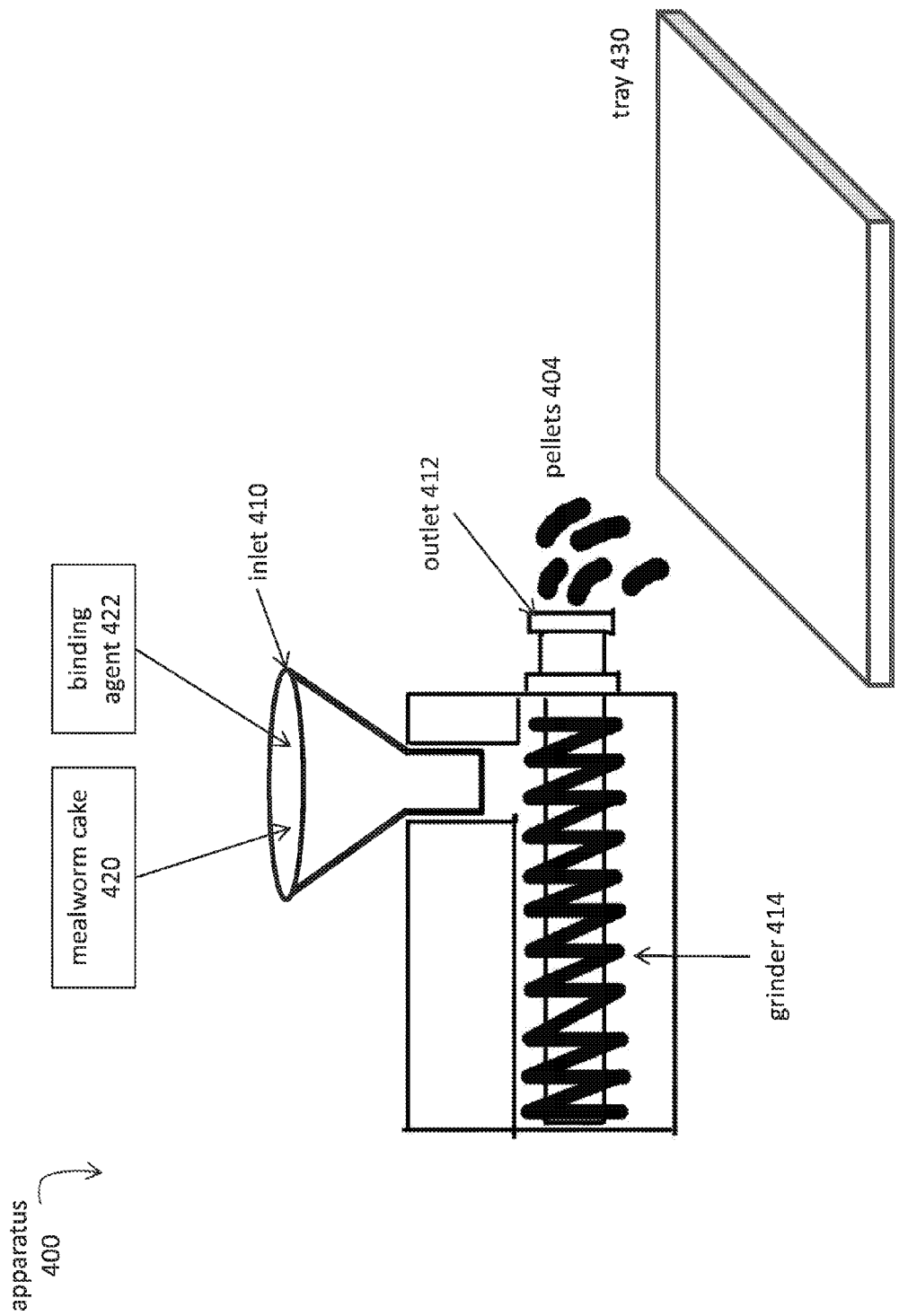

```
        B                    A

│
                              ▼
              ┌─────────────────────────────────┐ ╱─566
              │  Pump can pump the liquid from the │
              │      pipe to the spray jets        │
              └─────────────────────────────────┘
                              │
                              ▼
              ┌─────────────────────────────────┐ ╱─568
              │   Spray jets can spray mealworm frass │
              └─────────────────────────────────┘
                              │
                              ▼
              ┌─────────────────────────────────┐ ╱─570
              │ Sprayed liquid can saturate mealworm frass │
              │        creating a mixed liquid        │
              └─────────────────────────────────┘
                              │
                              ▼
              ┌─────────────────────────────────┐ ╱─572
              │  The mixed liquid can exit container │
              │       at one or more openings        │
              └─────────────────────────────────┘
                              │
                              ▼
           ┌────────────────────────────────────────┐ ╱─574
           │ The mixed liquid can form or mix with the liquid extract │
           └────────────────────────────────────────┘
                              │
                              ▼
    no                ◇ Does the liquid extract have ◇ ╱─576
    ◄─────────────────   one or more targeted
                          properties?

│ yes
                              ▼
              ┌─────────────────────────────────┐ ╱─578
              │       Remove liquid from tank        │     FIG. 5B-2
              └─────────────────────────────────┘
```

METHODS TO CONVERT MEALWORM CASTINGS TO ORGANIC FERTILIZER

CROSS-REFERENCE TO RELATED APPLICATIONS

This application is a continuation-in-part of U.S. patent application Ser. No. 14/326,826 (now U.S. Publication No. 2016-0009605), filed Jul. 9, 2014, the entire disclosure of which is incorporated herein by reference for all purposes.

FIELD

This relates generally to methods to convert a natural waste element (e.g., mealworm/Tenebrio moiltor casting/frass) to an organic fertilizer utilizing extraction and infusion. The methods can employ an infusion process to extract nutrients from mealworm castings.

BACKGROUND

Fertilizer is a substance that can be added to soil to improve the growth of plants. Soil may not provide the essential nutrients that a plant needs for optimum growth and production. After a plant is placed in the soil, the plant can absorb nutrients in the soil as the plant grows. As the plant absorbs nutrients in the soil, the soil can become deficient of nutrients. Most fertilizers can be used to replenish the nutrients lacking in the soil.

Some fertilizers can include ingredients such as animal compost, bone and blood meal, synthetic chemicals, human waste, and bat guano. These ingredients can include fungi, diseases, artificially produced chemicals, hormones, antibiotics, and/or steroids that can be absorbed by the plants or otherwise be detrimental to the plants, and can inhibit plant growth or worse, be fatal to the plants. If the plants produce vegetables or fruits (or other types of food), absorption of these chemicals, hormones, antibiotics, and/or steroids can be harmful to individuals that consume the vegetables or fruits. Additionally, the ingredients can lead to a fertilizer with a poor amount of nutrients or N—P—K rating. An alternative source for a nutrient-rich and chemical-free fertilizer may be needed.

SUMMARY

Most commercial fertilizers can include blends of natural and chemical ingredients that may not be healthy for indirect human consumption. An alternative source for a nutrient-rich and chemical-free fertilizer can be mealworm castings. While the mealworm castings can be used as a granular (i.e., powder) fertilizer, the mealworm castings can have a light and powdery composition. Due to its composition, the mealworm castings may not be suitable for commercial application or spreading as the mealworm castings can "flyaway" and may not be uniformly spread.

Methods to convert the light and powdery mealworm castings into a suitable commercial fertilizer product are disclosed. The methods can include saturating the mealworm castings using an infusion process with a liquid such as water until an elevated temperature is reached. The mealworm castings can be replenished and the infusion process can be repeated until the targeted N—P—K (Nitrogen-Potassium-Phosphorous) rating is achieved. The infusion process can produce a liquid concentrate or extract that can be used as a foliar spray, pest deterrent, or irrigation supplement. The saturated mealworm castings can be dried and formed into fertilizer pellets or into a granular soil-like product. That is, the disclosed organic fertilizer can be a single source organic fertilizer. In some examples, a binding agent such as dried mashed potato extract can be added to the saturated mealworm castings.

BRIEF DESCRIPTION OF THE DRAWINGS

FIG. 4A illustrates an exemplary apparatus for processing mealworm castings fertilizer into pellets according to examples of the disclosure.

FIG. 5B-1 and FIG. 5B-2 illustrate an exemplary process flow for converting mealworm castings to a liquid according to examples of the disclosure.

DETAILED DESCRIPTION

Figure 1A:
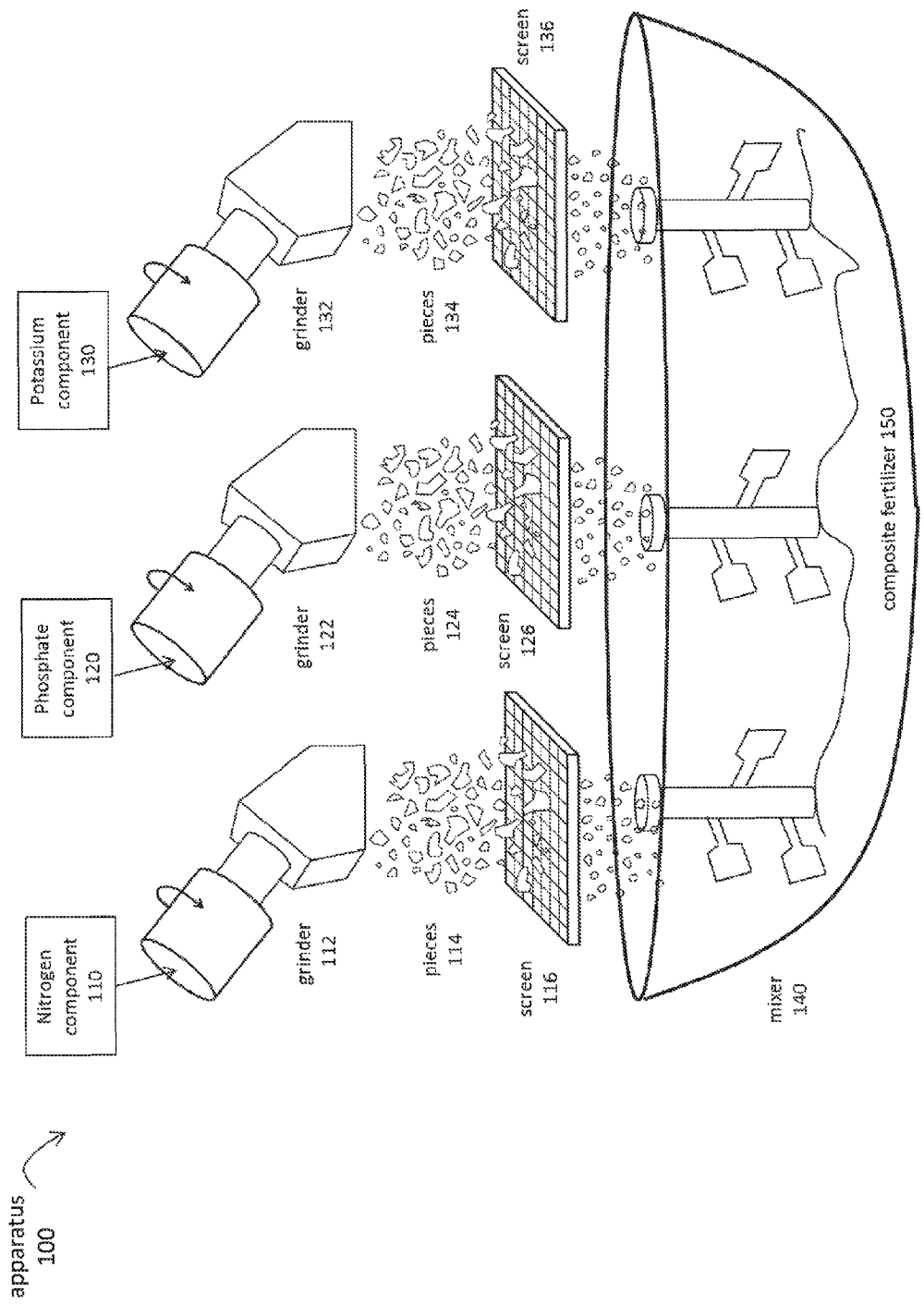
FIG. 1A illustrates an exemplary apparatus for producing a composite fertilizer in solid form.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This relates to methods to convert mealworm castings to fertilizer. The mealworm castings fertilizer can be formed into a liquid, solid pellet or solid granular form. The mealworm castings fertilizer can have a higher N—P—K rating and strength than conventional fertilizers. Additionally, the mealworm castings fertilizer can be void of fungi, diseases, artificially produced chemicals, hormones, antibiotics, steroids, and unwanted elements.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

Fertilizer is a substance that can be added to soil to improve the growth of plants. Soil may not provide the essential nutrients that a plant needs for optimum growth and production. After a plant is placed in the soil, the plant can absorb nutrients in the soil as the plant grows. As the plant absorbs nutrients in the soil, the soil can become deficient of nutrients. Fertilizer can be used to replenish the soil. Exemplary plants can include garden vegetables (e.g., commercial crops), citrus trees, flowers, and grass.

Plants can require six primary nutrients: carbon, hydrogen, oxygen, nitrogen, phosphorus, and potassium. Carbon, hydrogen, and oxygen can be supplied from the air and water. Nitrogen, phosphorous, and potassium can be supplied from the fertilizer. In addition to the six primary nutrients, plants and soil can require smaller amounts of micronutrients including calcium, magnesium, sulfate, boron, copper, zinc, manganese, iron, sodium, potash, and/or molybdenum.

Nitrogen can affect the growth and general health of the plant. Nitrogen can help make the proteins needed in order for the plant to produce new tissues. Phosphorous can help stimulate root growth. The stimulated root growth can help improve the vitality (e.g., bright, vibrant green leaves) and increase the size of the seeds. Potassium can help with the overall general health of the plant. Potassium can help the plant make carbohydrates, which not only helps with metabolic regulation but also can help with disease resistance.

The amount or percentage of nitrogen, phosphorous and potassium in a fertilizer can be quantified by what is called the N—P—K ratio or N—P—K rating. The N—P—K rating can indicate the proportion of each nutrient that the fertilizer contains. The first number can represent nitrogen (N), the second number can represent phosphorus (P), and the third number can represent potassium (K). For example, a fertilizer can have a N—P—K rating of 2-1-1, and a fertilizer with a N—P—K rating of 4-3-2 can have a higher strength of nitrogen, phosphorus and potassium than the fertilizer with a N—P—K rating of 2-1-1.

Figure 1B:
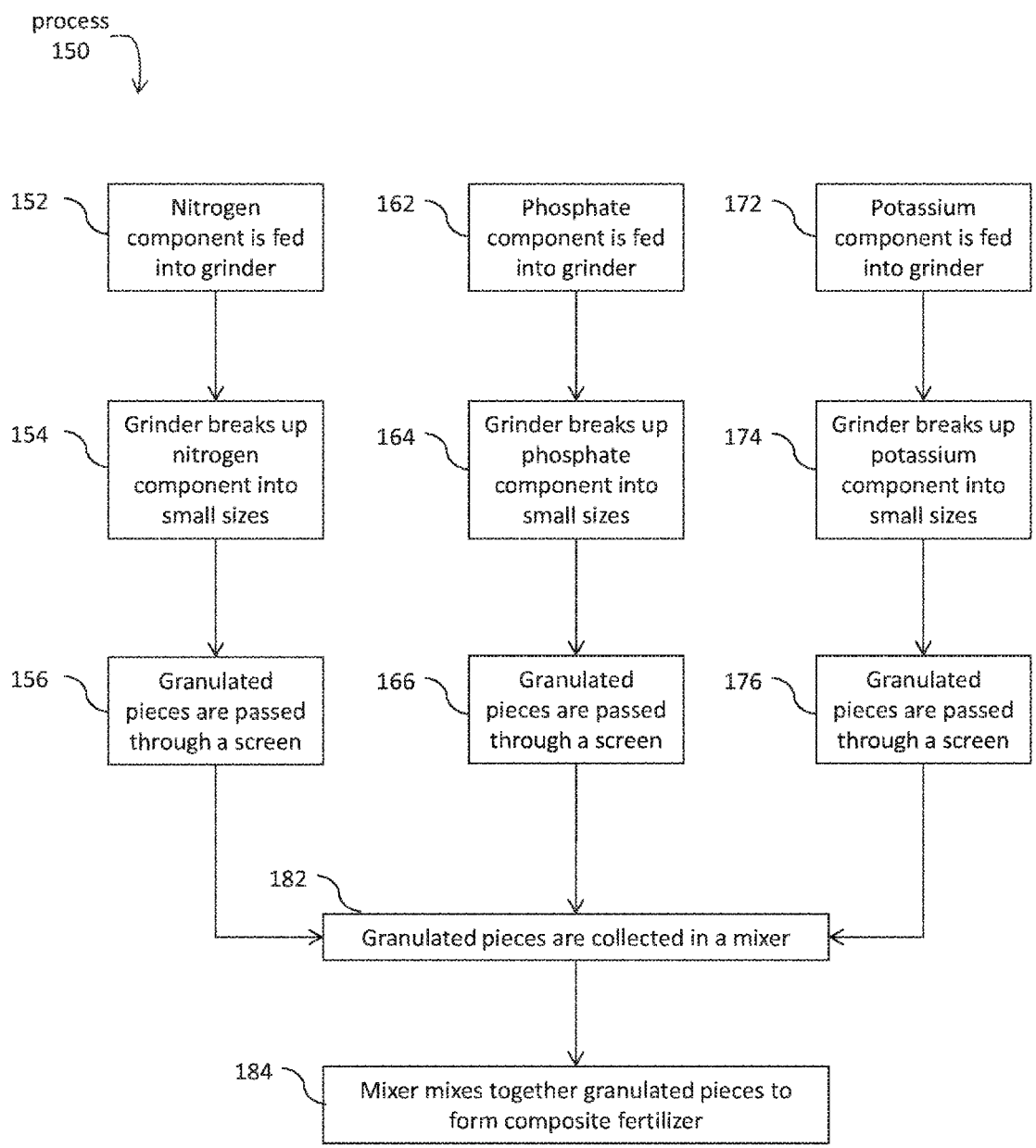
FIG. 1B illustrates an exemplary process flow for producing a composite fertilizer in solid form.

FIG. 1A illustrates an exemplary apparatus and FIG. 1B illustrates an exemplary process flow for producing a composite fertilizer in solid form. A nitrogen component 110 can be fed into grinder 112 (step 152 of process 150) of apparatus 100. Nitrogen component 110 can include, but is not limited to, anhydrous ammonia, aqua ammonia, urea, ammonium nitrate, ammonium sulfate, calcium nitrate, potassium nitrate, and sodium nitrate. Grinder 112 can be any type of apparatus that granulates the nitrogen component 110 into pieces with a small size (step 154). Grinder 112 can include a rotating drum to assist in breaking up the nitrogen component 110 into small sizes. The granulated pieces 114 can fall out of grinder 112 and can pass through a screen 116 (step 156). Screen 116 can be used to separate small pieces (i.e., pieces smaller than a certain size) and large pieces (i.e., pieces larger than a certain size). Similarly, a phosphate component 120 can be fed into grinder 122 (step 162). Phosphate component 120 can include, but is not limited to, rock phosphate, diammonium phosphate, monoammonium phosphate, and polyphosphate. Grinder 122 can break up phosphate component 120 into pieces (step 164). Granulated pieces 124 can fall out of grinder 122 and can pass through screen 126 (step 166). A potassium component 130 can be fed into grinder 132 (step 172). Potassium component 130 can include, but is not limited to, potassium chloride, potassium sulfate, potassium magnesium sulfate, potassium hydroxide, and potassium nitrate. Grinder 132 can break up potassium component 130 (step 174). Granulated pieces 134 can fall out of grinder 132 and can pass through screen 136 (step 176). A mixer 140 can be used to collect the pieces that have been separated by screens 116, 126 and 136 (step 182). The mixer 140 can mix together the pieces to form composite fertilizer 150 (step 184).

Figure 2A:
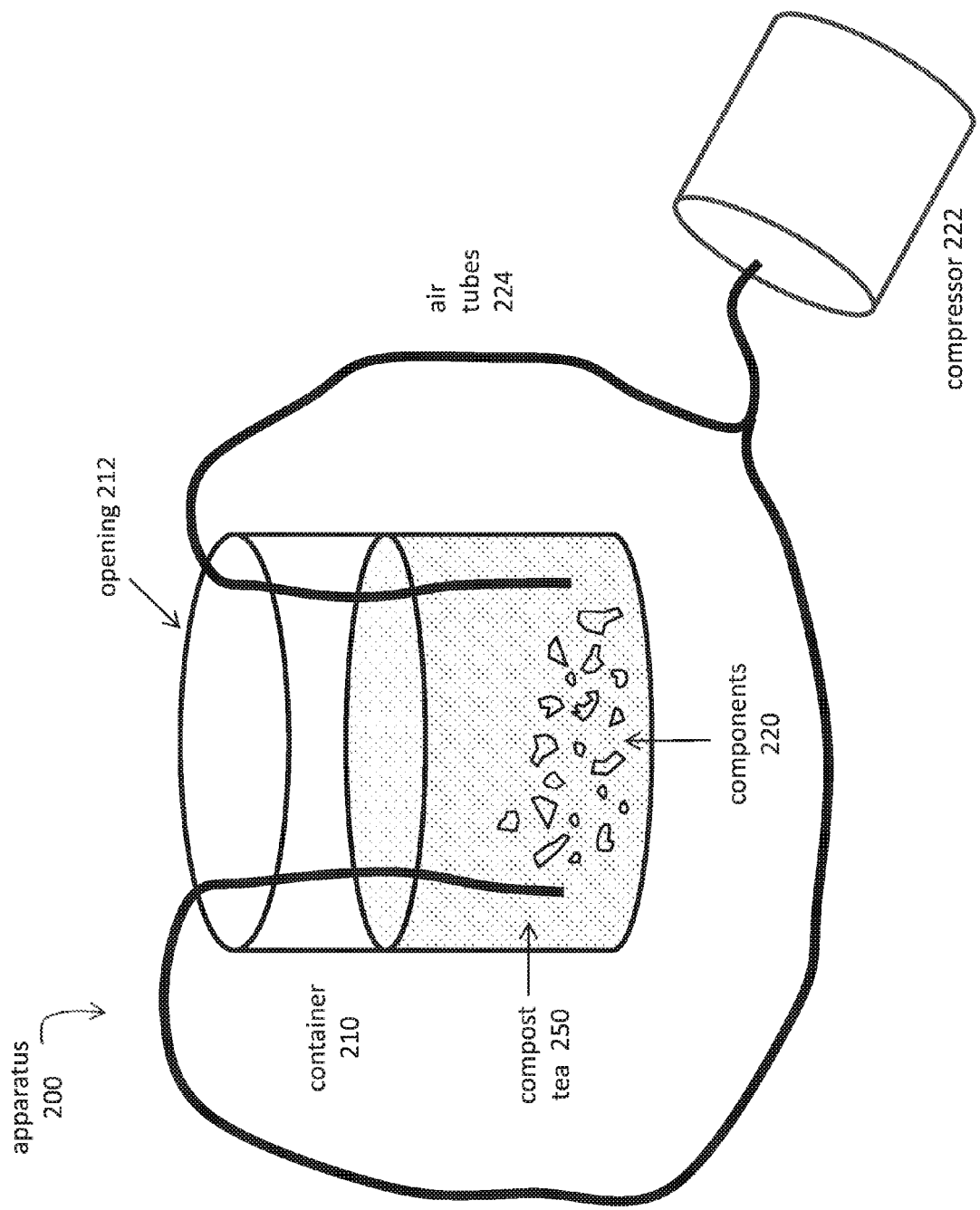
FIG. 2A illustrates an exemplary apparatus for producing a liquid tea fertilizer.
Figure 2B:
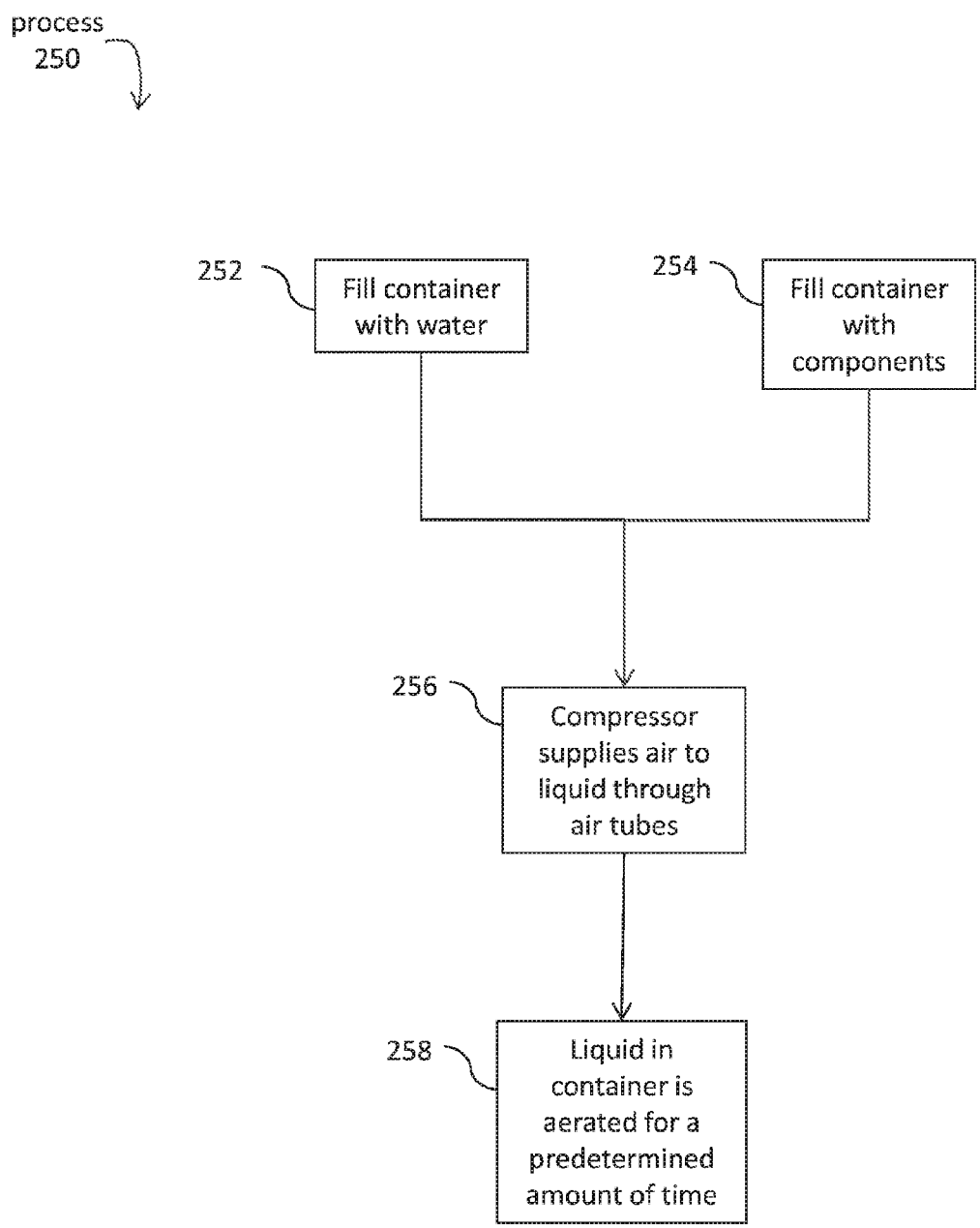
FIG. 2B illustrates an exemplary process flow for producing a liquid fertilizer.

Fertilizers can also come in liquid form. One example liquid can be a liquid fertilizer or compost tea. The compost tea can be a liquid made by steeping compost or fertilizer in water. FIG. 2A illustrates an exemplary apparatus and FIG. 2B illustrates an exemplary process flow for producing a compost tea. Apparatus 200 can include a container 210 with opening 212 located at the top of container 210. Air tubes 224 can be inserted into container 210 and can be attached to compressor 222. Compressor 222 can supply oxygen to help form the compost tea. Container 210 can be filled with a liquid such as water (step 252 of process 250). Components 220 can be added to the liquid contained in container 210 (step 254). In some examples, components 220 can be contained in a permeable bag made of any material such as muslin, hessian, or burlap. The compressor 222 can supply air through air tubes 224 to the liquid contained in container 210. The air from the compressor 222 and air tubes 224 can cause bubbles to form in the liquid from the oxygen and agitation moving through the liquid. The liquid can be aerated for a predetermined amount of time until compost tea 250 is formed. In some examples, container 210 can include a stirring mechanism, and the liquid can be stirred while the liquid is aerated.

While some fertilizers include ingredients such as animal compost, bone and blood meal, synthetic chemicals, and bat guano, these ingredients can include unwanted artificially produced chemicals, hormones, antibiotics, and/or steroids. An alternative ingredient used in fertilizers can be mealworm castings. Mealworm castings/frass can be a single source for organic fertilizers, which can be a fertilizer that excludes toxins and/or any of the other undesirable elements mentioned previously. The fertilizer produced using mealworm castings can be void of the artificially produced chemicals, hormones, antibiotics, and steroids. Mealworm castings can be the waste products from mealworms. A mealworm is a larva of the darkling beetle. Unlike earthworms, after a female darkling beetle lays its eggs, the eggs can hatch into tiny caterpillars called mealworms. There are many uses for mealworms. Mealworms can be used for scientific testing and fishing bait. In some countries, mealworms can be a protein-enhanced food source. Mealworms can be a food source for wild and pet birds, fish, pet lizards, snakes and insects such as spiders. Although there can be a wide variety of uses for mealworms, the mealworm castings or droppings are often discarded. As a result, the cost of obtaining the mealworm castings is minimal. Although mealworm castings are often discarded and the cost is minimal, the mealworm castings can be an excellent source of nitrogen, phosphorus, and potassium as an organic and bio-fertilizer product using the extraction and infusion process disclosed.

A mealworm can eat a variety of food such as leaves, sticks, grass, new plant growth, dead insects, and grains (e.g., wheat, oats, and corn). In some examples, to strengthen the N—P—K rating, the mealworms can be fed a diet of wheat bran and raw carrots. A diet of wheat bran and raw carrots can help the mealworms thrive and grow, can enhance the nutrient content of the mealworm castings, and also can cause the mealworm castings to be void of fungi, diseases and unwanted elements. The fertilizers comprising mealworm castings, as will be discussed below, can have a stronger N—P—K rating (e.g., an N—P—K rating of 4-3-2) compared to earthworm compost, which can have a N—P—K rating of 1-0-0. In some examples, the mealworm castings/frass disclosed can be formed into a pure, single source fertilizer without additive chemicals. In some examples, the mealworm casting fertilizer can be void of artificially produced chemicals. In some examples, the mealworm casting fertilizer can be a natural microbial fertilizer with over 75 million live microbes per gram, which can enhance plant growth.

While the mealworm castings can be used in its original state as harvested from growing bins, it can have a light and powdery composition. Due to this composition, the mealworm castings may not be suitable for commercial spreading as the mealworm castings can "flyaway" as it is being applied. However, the mealworm castings can be converted into a suitable and stable fertilizer that may not flyaway, as will be discussed below.

Figure 3A:
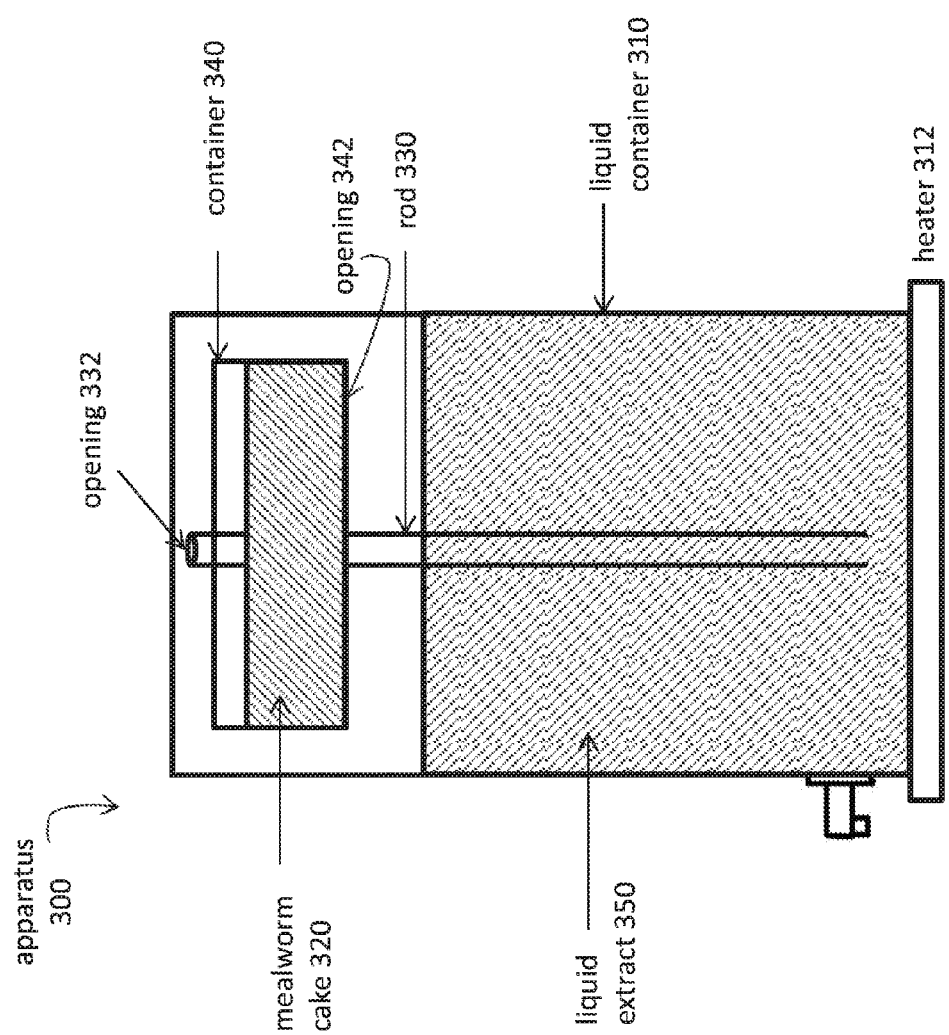
FIG. 3A illustrates exemplary apparatus for producing a liquid mealworm castings fertilizer according to examples of the disclosure.
Figure 3B:
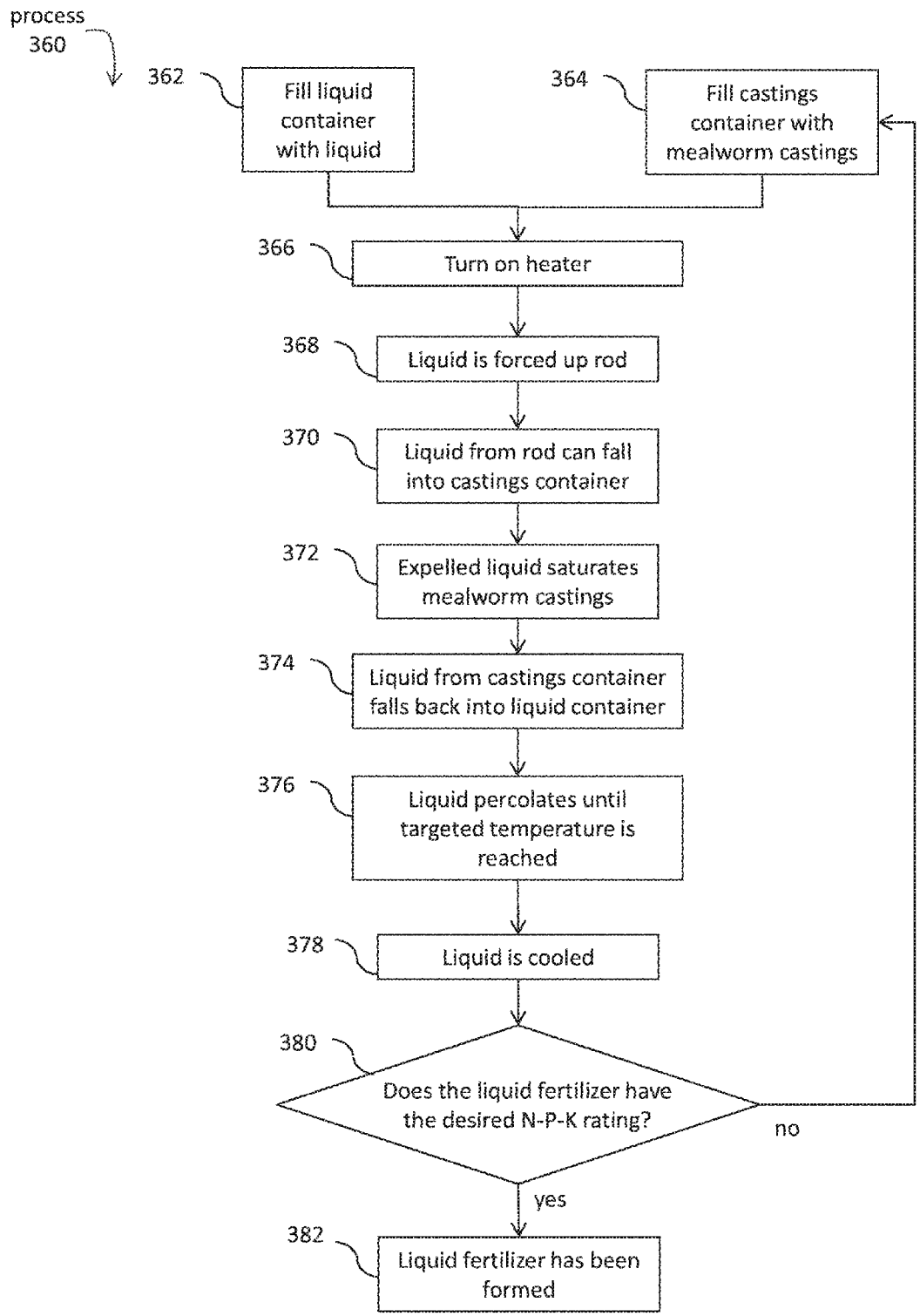
FIG. 3B illustrates an exemplary process flow for producing a liquid mealworm castings fertilizer according to examples of the disclosure.

FIG. 3A illustrates an exemplary apparatus and FIG. 3B illustrates an exemplary process flow for producing a liquid mealworm castings fertilizer according to examples of the disclosure. Apparatus 300 can include a liquid container 310 and a container 340. Liquid container 310 can be filled with a liquid such as water (step 362 of process 360). Container 340 can be filled with a byproduct substance such as mealworm castings 320 (step 364). In some examples, mealworm castings 320 can include at least one of the mealworm castings or any of the organic sources of nitrogen, phosphorus, and potassium including, but not limited to, bone meal, blood meal and bat guano. In some examples, the N—P—K rating can be changed by altering the ratio of mealworm castings and the organic sources of nitrogen, phosphorus, and potassium. A heater 312 attached, touching or immersed in liquid container 310 can be turned on (step 366). Due to the elevated temperature, the liquid in liquid container 310 can be forced up the rod 330 (step 368). Rod 330 can include an opening 332 located at the top. The liquid can expel from opening 332 and can fall into container 340 (step 370). The expelled liquid can saturate the mealworm castings 320 located in container 340 (step 372). One or more openings 342 in the bottom of the container 340 can allow a liquid extract 350, which is infused with the mealworm castings 320, to drip into the liquid container 310 (step 374). Opening 342 can be any type of opening that allows liquid to pass through, but prevents the mealworm castings 320 from passing through. The liquid can be infused and can recirculate through the mealworm castings 320 until the liquid extract 350 is heated to a targeted temperature (step 376). In some examples, the targeted temperature can be below the boiling point of water to allow microbes and enzymes to remain alive. Heater 312 can be turned off, and the liquid contained in liquid container 310 can be cooled (step 378). Cooling can involve either active cooling or passive cooling. In some examples, the liquid contained in liquid container 310 can be drained to expedite the process of passive cooling. If the liquid is drained, liquid container 310 can be refilled with the cooled liquid. The process can be repeated by replacing the container 340 with "fresh" unsaturated mealworm castings (step 364). The process can be repeated until the desired N—P—K rating is achieved (step 380). Once the desired N—P—K rating is achieved, liquid organic fertilizer has been formed (step 382). In some examples, the process is repeated at least three times. In some examples, the process is repeated at least one time. Repeating the process can enhance the quality of the fertilizer, which may be beneficial for fertilizers used as an organic soil treatment.

In some examples, liquid container 310 can be filled with three gallons of water in step 362, and container 340 can be filled with two pounds of mealworm castings. The ratio of mealworm castings 320 and liquid container 310 can be adjusted to achieve different N—P—K ratings, moisture content, and processing times. In some examples, the targeted temperature can be 185-190° F. In some examples, the targeted temperature can be 200-210° F.

In some examples, organic liquid fertilizer can be used in sprayers and/or drip-lines. In some examples, liquid fertilizer can be diluted with another liquid such as water and can be used as a foliar spray, plant or vegetable pest deterrent or irrigation application. For example, a ratio of liquid fertilizer to water of 1:3 can be used for a pest or mold deterrent. A ratio of liquid fertilizer to water of 1:4 can be used for a foliar spray. A ratio of liquid fertilizer to water of 1:10 can be used as an irrigation or drip-line fertilizer.

Figure 4B:
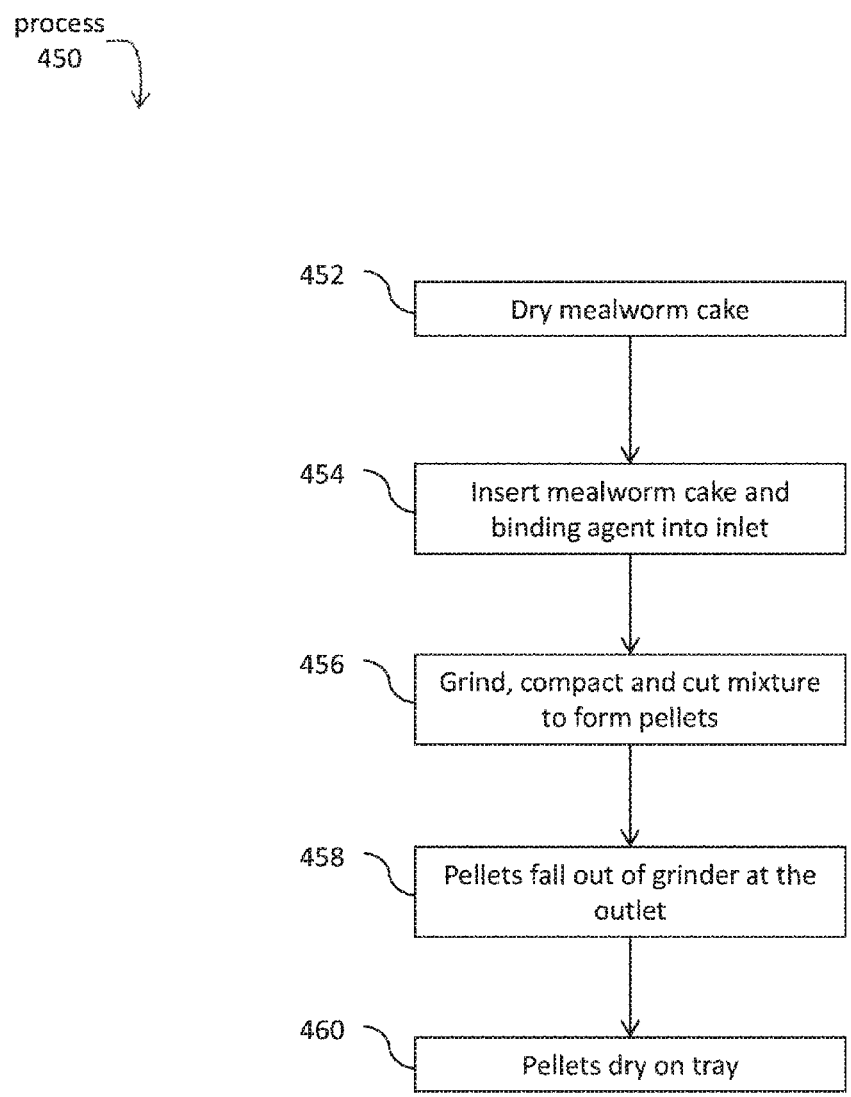
FIG. 4B illustrates an exemplary process flow for processing a liquid mealworm castings fertilizer into pellets according to examples of the disclosure.

In some examples, liquid fertilizer from the apparatus and method illustrated in FIGS. 3A-3B can be processed into pellets and a granular fertilizer. FIG. 4A illustrates an exemplary apparatus and FIG. 4B illustrates an exemplary process flow for processing a mealworm castings fertilizer into pellets according to examples of the disclosure. Apparatus 400 can include an inlet 410, an outlet 412, a grinder 414, and a tray 430. Mealworm castings 320 from container 340 of FIG. 3 can be dried to remove moisture (step 452 of process 450). Mealworm castings 320 can be dried or partially dried using any type of mechanical dryer or can be exposed to the sun. In some examples, mealworm castings 420 can be a semi-dry paste.

Mealworm castings 420 and a binding agent 422 can be inserted into inlet 410 (step 454). Binding agent 422 can be any dried organic substance that binds to the mealworm castings 420. Binding agent 422 can include, but is not limited to, dried mash potato extract, cornmeal, or hominy. The mealworm castings 420 and binding agent 422 can fall into grinder 414. Grinder 414 can mix the mealworm castings 420 and binding agent together, compact the mixture, and cut the compacted mixture to form pellets or granules 404 (step 456). Grinder 414 can be, for example, a screw compactor or grinder. Pellets 404 can fall out of grinder 414 at outlet 412, and can fall (or be placed) onto tray 430 (step 458). The pellets 404 can remain on tray 430 to dry (step 460). In some examples, the pellets can be dried completely.

In some examples, the mealworm castings 320 can be broken up using a cutting device such as a slicer to form a granular soil-like product. The N—P—K rating for the granular soil-like product can be the same as the N—P—K rating for the pellets, but can dissolve faster when watered. In some examples, an apparatus similar to apparatus 400 illustrated in FIG. 4A can be used with a slicer adapter to form the granular soil-like product. In some examples, the granular soil-like product can be formed without a binding agent.

Figure 5A:
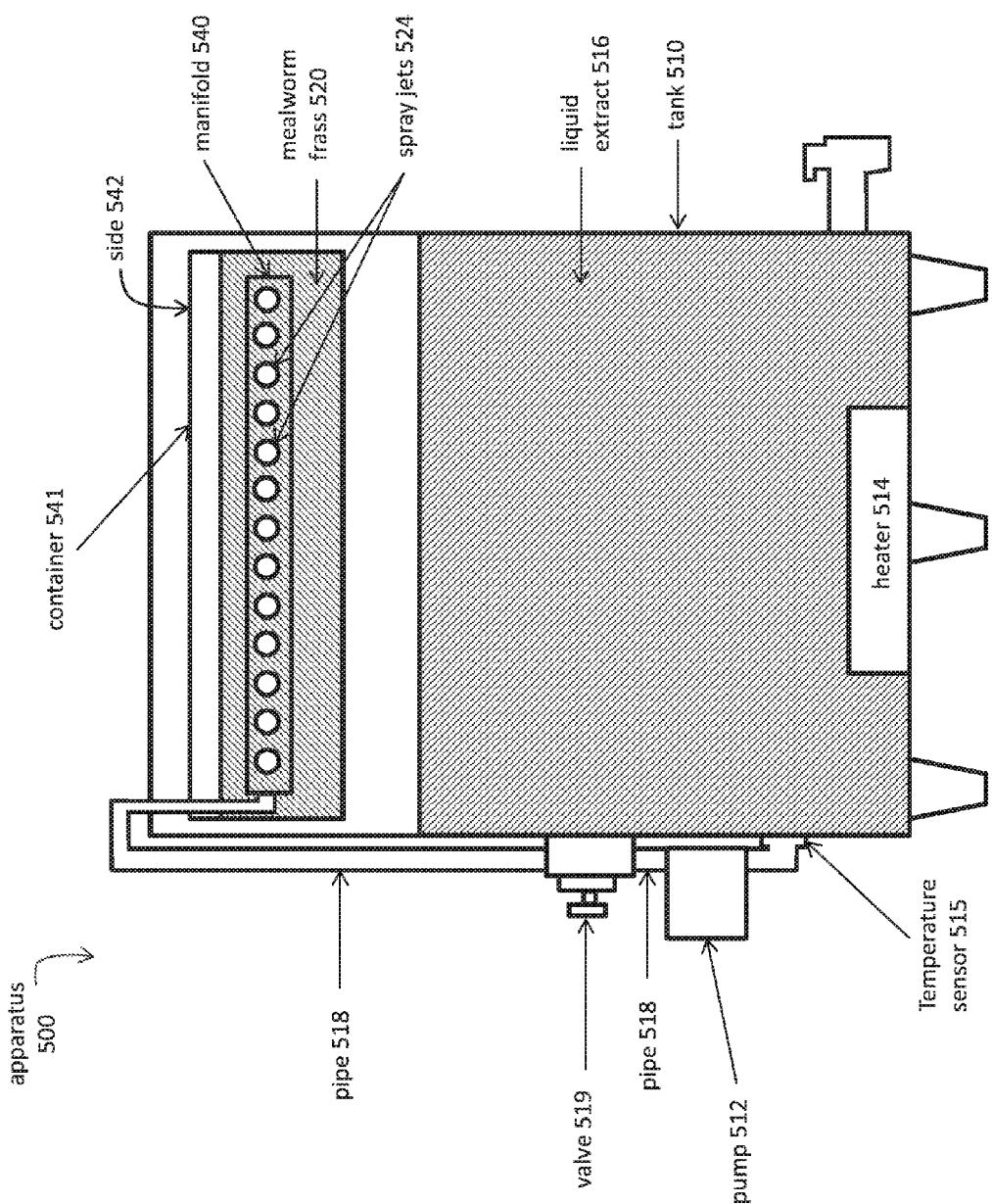
FIG. 5A illustrates an exemplary apparatus for converting mealworm castings to a liquid according to examples of the disclosure.

In some examples, the strength of the fertilizer can be enhanced by utilizing a pressure-infused process. The pressure-infused process and produce a bio-fertilizer, which can be a fertilizer including high (e.g., over 75 million) content microbes. FIG. 5A illustrates an exemplary apparatus for converting mealworm castings to a liquid according to examples of the disclosure. Apparatus 500 can include tank 510, pump 512, heater 514, temperature sensor 515, and container 541. Tank 510 can be configured to hold any liquid such as water or a liquid extract (e.g., liquid extract 516). Pump 512 can be any type of pump configured to inject liquid from tank 510 to pipe 518. Heater 514 can be any type of heater configured to increase the temperature of tank 510 and/or liquid extract 516.

Temperature sensor 515 can be configured to measure the temperature of liquid extract 516 and/or tank 510. Temperature sensor 515 can be located anywhere including any location between tank 510 and pump 512. In some examples, temperature sensor 515 can be located within pipe 518 between tank 510 and pump 512. Temperature sensor 515 can restrict cold water (e.g., water colder than the temperature sensor's set point) from entering pipe 518.

Container 541 can be configured to hold any solid product such as mealworm frass (i.e., mealworm castings) 520. In some examples, container 541 can be cylindrical. Container 541 can be placed at any location in tank 510. In some examples, container 541 can be located above and not touch liquid extract 516. In some examples, container 541 can be located a certain distance (e.g., 3 inches) above liquid extract 516. Container 541 can be any type of container capable of holding mealworm frass 520. In some examples, one or more sides of container 541 can include a plurality of openings. For example, bottom (e.g., side opposite side 542) of container 541 can include a screen with a plurality of openings to allow only liquid to penetrate through. In some examples, sides of container 541 can include a plurality of openings. In some examples, a portion (e.g., the bottom half) of container 541 can include a plurality of openings.

Apparatus 500 can further include manifold 540 coupled to a plurality of spray jets 524. Spray jets 524 can be configured for uniformly distributing the pressurized liquid from pipe 518 to mealworm frass 520. Spray jets 524 can be include any spray pattern, including, but not limited to, a plurality of circles. In some examples, each spray jet 524 can be located along the circumference of manifold 540. In some examples, plurality of spray jets 524 can be spaced 3" apart. In some examples, manifold 540 can be a disbursement manifold and can be attached to container 541 using one or more clips (e.g., adjustable holding clips) (not shown). Manifold 540 can be positioned at any vertical location along container 541. Spray jets 524 can be located anywhere in close proximity to mealworm frass 520. In some examples, spray jets 524 can be immersed in mealworm frass 520. In some examples, the location of spray jets 524 can be adjusted to vary the consideration the consistency and saturation of mealworm frass 520 and/or concentration of the resultant liquid (e.g., liquid exiting manifold 540 and/or liquid extract 516). Placing spray jets 524 too close to side 542 of manifold 540 can cause mealworm frass 520 to turn into a mud-like consistency, which may make it difficult for liquid from spray jets 524 to seep through mealworm frass 520. Placing spray jets 524 too close to the bottom of container 541 can prevent non-uniform (e.g., liquid from spray jets 524 may penetrate the bottom of the mealworm frass 520 more than the top of the mealworm frass 520) distribution of the liquid exiting spray jets 524. Non-uniform distribution of the liquid exiting spray jets 524 may also lead to non-uniform saturation and nutrient extraction from mealworm frass 520. In some examples, manifold 540 can be positioned at the halfway location (e.g., vertically centered) of container 541. The halfway location can allow sufficient (i.e., an amount capable of achieving the targeted N—P—K ratio) saturation of mealworm frass 520 with liquid exiting spray jets 524.

Figures 1, 5B:
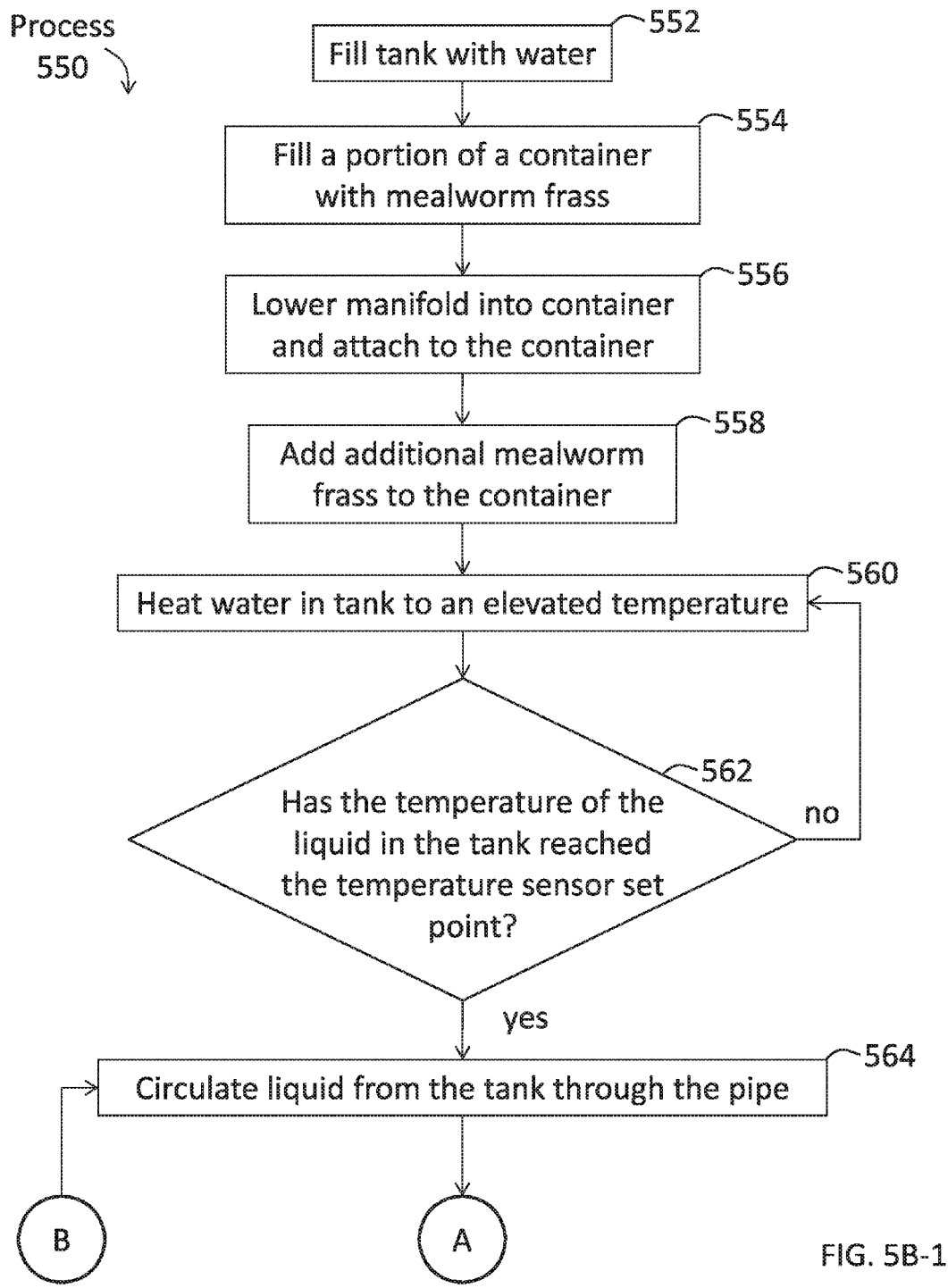

FIG. 5B-1 and FIG. 5B-2 illustrate an exemplary process flow for converting mealworm castings into a liquid according to examples of the disclosure. Tank 510 can be filled with water (step 552 of process 550). In some examples, the water can be non-chlorinated (i.e., completely chlorine-free) or distilled water. Any amounts of chlorine in the water can kill microbes and/or bacteria that could be included in a bio-fertilizer (i.e., a fertilizer that contains living microorganisms). In some examples, tank 510 can have a volume, and water can fill ⅔ (i.e., 66.6%) the volume of tank 510.

Mealworm frass 520 can be added to container 541 (step 554 of process 550). In some examples, mealworm frass 520 can be added until 50% of container 541 can be filled. In some examples, the added mealworm frass 520 can include mealworm castings not previously diluted or unexposed to any liquid. Manifold 540 can be lowered into and attached to container 541 (step 556 of process 550). Additional mealworm frass 520 can be added without completely filling container 541 with mealworm frass 520 (step 558 of process 550). In some examples, the additional mealworm frass 520 can be added until at least manifold 540 and/or spray jets 524 are covered with mealworm frass 520. Leaving some room in container 541 can prevent mealworm frass 520 from overflowing into liquid extract 516. In some examples, mealworm frass 520 may expand when exposed to the warm liquid exiting spray jets 524. In some examples, container 541 can be filled with mealworm frass 520 until 3" of container 541 remains open for mealworm frass 520 expansion.

Heater 514 can heat the water included in tank 510 to an elevated temperature (step 560 of process 550). The elevated temperature can be such that water can penetrate quickly and easily through the mealworm castings allowing for efficient liquid extraction. With efficient liquid extraction, the resultant liquid can have a higher N—P—K ratio and may not require as many iterations (as discussed below). In some examples, the elevated temperature can be a temperature greater than 90° F. In some examples, the elevated temperature can be 120° F. The elevated temperature can be chosen such that one or more microbes or microorganisms can survive. For example, an elevated temperature greater than 140° F. can kill some or all living bacteria in the microbes. The living bacteria in the microbes can be useful for plant growth and fertilization. In some examples, the process can yield a fertilizer containing at least 14 million microorganisms per gram. When the temperature of the liquid (e.g., water) contained in tank 510 reaches the setup point of the temperature sensor, the temperature sensor can allow liquid to circulate from tank 510 through pipe 518 (step 562 of process 550). Pump 515 can pressurize the liquid and pump the liquid from pipe 518 to spray jets 524 (step 564 of process 550). During this time, heater 514 can be configured to regulate the temperature of the liquid in tank 510. In some examples, the regulated temperature can be below 140° F.

In some examples, pump 512 can be configured to inject liquid at a pressure of 15 pounds per square inch (PSI). The pressure can be chosen based on the concentration of the liquid extract 516 and/or the density of mealworm frass 520. In some examples, a higher pressure can be chosen for less concentrated liquid and vice versa. For example, 15 PSI can be chosen when the liquid is pure water. In some examples, 5 PSI can be chosen when the liquid has already circulated one or more times through the mealworm frass and/or the liquid has an N—P—K value near the targeted N—P—K value (e.g., 4-3-2 N—P—K value). In some examples, a pressure lower than or equal to 15 PSI can be chosen to prevent mealworm frass 520 from being pressure-forced (e.g., the pressure can be high enough to cause mealworm frass 520 to spill out) out of manifold 540.

Spray jets 524 can be configured to spray mealworm frass 520 (step 566 of process 550). In some examples, the temperature of the liquid mobilizing from tank 512 through pipe 518 to spray jets 524 and/or through mealworm frass 520 can change (e.g., decrease) by up to 30° F. In some examples, spray jets 524 can be configured with at least one or more nozzles directing the liquid (exiting pipe 518) to one or more sides of manifold 540. In some examples, the pressurized liquid can create turbulence in mealworm frass, which can allow enhanced saturation and extraction of mealworm frass 520.

The sprayed liquid can saturate mealworm frass 520 (step 568 of process 550), which can cause nutrients from mealworm frass to mix with sprayed liquid exiting spray jets 524 (step 570 of process 550). The mixed liquid can contain one or more ingredients contained in mealworm frass 520. The mixed liquid can exit container 540 at one or more openings (i.e., mixed liquid can pass through one or more openings in the container) (step 572 of process 550) and can form or mix with liquid extract 516 (step 574 of process 550).

The process can be repeated with liquid extract 516 until the targeted N—P—K level has been reached (i.e., N—P—K value is greater than or equal to a targeted N—P—K value) (step 576 of process 550). In some examples, the process can be repeated until liquid extract 516 exhibits a certain color (e.g., black and opaque). In some examples, mealworm frass 520 can be replaced with undiluted mealworm frass 520 to increase the strength of liquid extract 516.

Liquid extract 516 can be removed from tank 510 and utilized as liquid fertilizer. In some examples, liquid extract 516 can be diluted based on the intended fertilization technique. For example, the liquid fertilizer can be used in sprayers and/or drip-lines. In some examples, liquid extract 516 can be diluted with another liquid such as water and can be used as a foliar spray, pest deterrent or irrigation. For example, a ratio of liquid extract to water of 1:3 can be used for a pest or mold deterrent. In some examples, a ratio of liquid extract to water of 1:4 can be used for a foliar spray. In some examples, a ratio of liquid extract to water of 1:10 can be used as an irrigation or drip-line fertilizer. In some examples, the fertilizer can be a live microbial fertilizer used for hydroponic growing and aquaponics growing systems.

A method for forming a fertilizer is disclosed. In some examples, the method can comprise: heating a first liquid to an elevated temperature; pressurizing the heated first liquid with a pump; allowing the pressurized heated first liquid to pass through a pipe; transporting the pressurized heated first liquid using the pipe to a plurality of spray jets; spraying Tenebrio molitor castings with the pressurized heated first liquid using the plurality of spray jets; extracting nutrients from the Tenebrio molitor castings; and collecting a second liquid including the extracted nutrients. Additionally or alternatively, in some examples, the method can comprise: recirculating the second liquid with the pump through the pipe; recirculating the second liquid through the plurality of spray jets; spraying Tenebrio molitor castings with the second liquid using the plurality of spray jets; extracting additional nutrients from the Tenebrio molitor castings; and collecting a third liquid, the third liquid including the second liquid and the extracted additional nutrients. Additionally or alternatively, in some examples, the method further comprises: replacing the sprayed Tenebrio molitor castings with unexposed Tenebrio molitor castings prior to spraying with the second liquid. Additionally or alternatively, in some examples, pressurizing the heated first liquid includes injecting the first liquid at a pressure of 15 pounds per square inch. Additionally or alternatively, in some examples, pressurizing the heated first liquid includes injecting the first liquid at a pressure of 5 pounds per square inch. Additionally or alternatively, in some examples, the method further comprises: filling a tank with the first liquid prior to heating the first liquid, the first liquid consisting of non-chlorinated or distilled water. Additionally or alternatively, in some examples, filling the tank with the first liquid includes adding the first liquid to the tank until 66.6% of the tank is filled with the first liquid. Additionally or alternatively, in some examples, the method further comprises: filling a first portion of a container with the Tenebrio molitor castings; positioning the plurality of spray jets in the container; and filling a second portion of the container with additional Tenebrio molitor castings. Additionally or alternatively, in some examples, filling the first portion of the container includes adding the Tenebrio molitor castings until 50% of the container is filled with the Tenebrio molitor castings. Additionally or alternatively, in some examples, the elevated temperature is 120° F. Additionally or alternatively, in some examples, the elevated temperature is 90° F. Additionally or alternatively, in some examples, extracting nutrients from the Tenebrio molitor castings includes creating turbulence in the Tenebrio molitor castings. Additionally or alternatively, in some examples, collecting the second liquid includes allowing the second liquid to pass through one or more openings of a container, the container including the Tenebrio molitor castings. Additionally or alternatively, in some examples, extracting nutrients from the Tenebrio molitor castings includes: saturating the Tenebrio molitor castings with the pressurized heated first liquid; and mixing the nutrients with the pressurized heated first liquid to create the second liquid. Additionally or alternatively, in some examples, the method further comprises: determining a N—P—K value of the second liquid; and removing the second liquid from a tank when the N—P—K value greater than or equal to a targeted N—P—K value. Additionally or alternatively, in some examples, the method further comprises: determining a color of the second liquid; and removing the second liquid from a tank when the color of the second liquid is black and opaque. Additionally or alternatively, in some examples, the method further comprises: adding one part water to three parts of the second liquid to create the fertilizer, the fertilizer being a liquid fertilizer; and using the liquid fertilizer as a pest or mold deterrent. Additionally or alternatively, in some examples, the method further comprises: adding one part water to four parts of the second liquid to create the fertilizer, the fertilizer being a liquid fertilizer; and using the liquid fertilizer as a foliar spray. Additionally or alternatively, in some examples, the method further comprises: adding one part water to tens parts of the second liquid to create the fertilizer, the fertilizer being a liquid fertilizer; and using the liquid fertilizer for irrigation or in a drip-line system. Additionally or alternatively, in some examples, the fertilizer is a bio-fertilizer including over 75 million microbes.

While various examples have been described above, it should be understood that they have been presented by way of example only, and not by way of limitation. Although examples have been fully described with reference to the accompanying drawings, the various diagrams can depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, whether or not such features are presented as being part of a described example. Thus, the breadth and scope of the present disclosure should not be limited by any of the above-described examples.

What is claimed is:

1. A method for forming a fertilizer, the method comprising:
    heating a first liquid to an elevated temperature;
    pressurizing the heated first liquid with a pump;
    allowing the pressurized heated first liquid to pass through a pipe;
    transporting the pressurized heated first liquid using the pipe to a plurality of spray jets;
    spraying Tenebrio molitor castings with the pressurized heated first liquid using the plurality of spray jets;
    extracting nutrients from the Tenebrio molitor castings; and
    collecting a second liquid including the extracted nutrients.

2. The method of claim 1, further comprising:
    recirculating the second liquid with the pump through the pipe;
    recirculating the second liquid through the plurality of spray jets;
    spraying Tenebrio molitor castings with the second liquid using the plurality of spray jets;
    extracting additional nutrients from the Tenebrio molitor castings; and
    collecting a third liquid, the third liquid including the second liquid and the extracted additional nutrients.

3. The method of claim of 2, further comprising:
    replacing the sprayed Tenebrio molitor castings with unexposed Tenebrio molitor castings prior to spraying with the second liquid.

4. The method of claim 1, wherein pressurizing the heated first liquid includes injecting the first liquid at a pressure of 15 pounds per square inch.

5. The method of claim 1, wherein pressurizing the heated first liquid includes injecting the first liquid at a pressure of 5 pounds per square inch.

6. The method of claim 1, further comprising:
    filling a tank with the first liquid prior to heating the first liquid, the first liquid consisting of non-chlorinated or distilled water.

7. The method of claim 6, wherein filling the tank with the first liquid includes adding the first liquid to the tank until 66.6% of the tank is filled with the first liquid.

8. The method of claim 1, further comprising:
    filling a first portion of a container with the Tenebrio molitor castings;
    positioning the plurality of spray jets in the container; and
    filling a second portion of the container with additional Tenebrio molitor castings.

9. The method of claim 8, wherein filling the first portion of the container includes adding the Tenebrio molitor castings until 50% of the container is filled with the Tenebrio molitor castings.

10. The method of claim 1, wherein the elevated temperature is 120° F.

11. The method of claim 1, wherein the elevated temperature is 90° F.

12. The method of claim 1, wherein extracting nutrients from the Tenebrio molitor castings includes creating a turbulence in the Tenebrio molitor castings.

13. The method of claim 1, wherein collecting the second liquid includes allowing the second liquid to pass through one or more openings of a container, the container including the Tenebrio molitor castings.

14. The method of claim 1, wherein extracting nutrients from the Tenebrio molitor castings includes:
    saturating the Tenebrio molitor castings with the pressurized heated first liquid; and
    mixing the nutrients with the pressurized heated first liquid to create the second liquid.

15. The method of claim 1, further comprising:
    determining a N—P—K value of the second liquid; and
    removing the second liquid from a tank when the N—P—K value greater than or equal to a targeted N—P—K value.

16. The method of claim 1, further comprising:
    determining a color of the second liquid; and
    removing the second liquid from a tank when the color of the second liquid is black and opaque.

17. The method of claim 1, further comprising:
    adding one part water to three parts of the second liquid to create the fertilizer, the fertilizer being a liquid fertilizer; and
    using the liquid fertilizer as a pest or mold deterrent.

18. The method of claim 1, further comprising:
    adding one part water to four parts of the second liquid to create the fertilizer, the fertilizer being a liquid fertilizer; and
    using the liquid fertilizer as a foliar spray.

19. The method of claim 1, further comprising:
    adding one part water to tens parts of the second liquid to create the fertilizer, the fertilizer being a liquid fertilizer; and
    using the liquid fertilizer for irrigation or in a drip-line system.

20. The method of claim 1, wherein the fertilizer is a bio-fertilizer including over 75 million microbes.

* * * * *